Patented Nov. 15, 1938

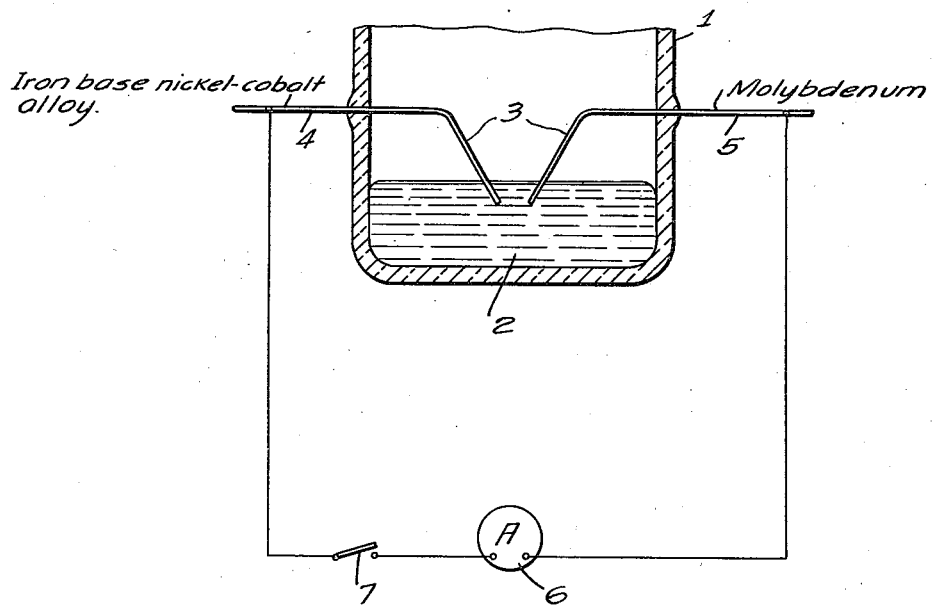

2,137,057

UNITED STATES PATENT OFFICE 2,137,057

THERMOCOUPLE

Ruric C. Mason, Wilkinsburg, Pa., assignor to Westinghouse Electric & Manufacturing Company, East Pittsburgh, Pa., a corporation of Pennsylvania Application February 20, 1937, Serial No. 126,884

8 Claims. (Cl. 136—5)

My invention relates to thermocouples and more particularly to thermocouples capable of being sealed within glass vessels.

It often becomes necessary and desirable to ascertain the exact temperature of various working components, such as a pool of mercury, or the like, which may be disposed within a glass vessel under a vacuum or in the presence of a controlled atmosphere. This is a very difficult task to do satisfactorily with those methods known to the art. It is, therefore, an object of my invention to provide means whereby the temperature of the contents of a sealed glass vessel or the like, may readily be obtained.

A further object of my invention is to provide a thermocouple, the members of which possess properties enabling them to be placed through a glass partition and to make a satisfactory seal therewith.

Other objects of my invention will either be pointed out specifically in the course of the following description of a device embodying my invention or will be apparent from such description.

In the accompanying single sheet of drawing, I show a portion of a glass vessel 1, having therein a pool of mercury 2, and a thermocouple 3, one member 4 of which comprises an iron-base nickel-cobalt alloy and the second member 5 of which comprises molybdenum. A suitable meter 6 may be connected with the thermocouple 3 and a switch 7 to measure the quantity of current flowing through the circuit.

The member 4 of my thermocouple consists of an iron-base nickel-cobalt alloy, the combined nickel cobalt content being between 40% and 55% with the cobalt at least 10%. Such an alloy has a predetermined coefficient of expansion over a comparatively wide range of temperatures which permits the alloy to be used in providing a vacuum-tight seal with certain glasses, particularly boro-silicate glass and ordinary lead glass as shown in the accompanying figure. In forming such a seal with a wire composed of this alloy, a small hole is melted in the glass wall of a container or glass partition through which the metal lead is inserted and the molten glass squeezed around such lead, whereupon it fuses thoroughly in contact therewith. To effect such a seal satisfactorily, it is necessary that the metal be one which the glass will "wet." The alloy, as hereinbefore described, will readily seal with particularly boro-silicate glass and ordinary lead glass, as specifically described and claimed in Patent 1,942,260, issued on July 5, 1929.

The second member 5 of my thermocouple may consist of any element or alloy which will suitably seal with the glass wall or partition in a manner similar to the iron-base nickel-cobalt alloy hereinabove described. Tungsten, molybdenum and platinum are satisfactory elements for the second member of my thermocouple. These elements will satisfactorily "wet" and are capable of producing a suitable thermo-electric power when coupled with the previously described alloy. In forming a thermocouple any of these elements may be welded with the alloy in any usual manner so as to form a satisfactory junction therewith, or where it is desired to use the thermocouple in connection with a mercury pool as shown in the accompanying drawing, the wires may be inserted directly into such pool without being welded or mechanically connected. The current in my thermocouple flows from the alloy over the hot junction to the second member of such thermocouple. The average thermo-electric power of such couple from 0° C. to 100° C. will be approximately 40 microvolts.

I wish it to be understood that any element which will satisfactorily seal with glass may be used in conjunction with the previously described iron-base nickel-cobalt alloy, as a second member of the thermocouple. It is therefore, obvious that by using a thermocouple which is capable of a vacuum seal with glass, such couple may be used to ascertain the exact temperature of the various working components located within a glass vessel which is under a vacuum or within a controlled atmosphere.

While I have in the foregoing described certain particular embodiments of my invention, it will be understood that these are for purposes of illustration only and that the broad principles may be otherwise utilized as will be readily apparent to those skilled in the art. I accordingly desire that the following claims shall be accorded the broadest construction of which their terms are susceptible in view of the limitations imposed by the prior art.

I claim as my invention:

1. A thermocouple, one member of which comprises an iron-base nickel-cobalt alloy, and the second member of which comprises molybdenum.

2. A thermocouple, one member of which comprises an iron-base nickel-cobalt alloy and the second member of which comprises tungsten.

3. A thermocouple, one member of which comprises an iron-base nickel-cobalt alloy, and the second member of which comprises platinum.

4. A thermocouple, one member of which consists of an iron-base alloy comprising a combined nickel and cobalt content of between 40% and 55% with the cobalt at least 6.75%, and the second element of which comprises molybdenum.

5. A thermocouple, one member of which consists of an iron-base alloy comprising a combined nickel and cobalt content of between 40% and 55% with the cobalt at least 6.75% and the second element of which comprises tungsten.

6. A thermocouple, one member of which consists of an iron-base alloy comprising a combined nickel and cobalt content of between 40% and 55% with the cobalt at least 6.75% and the second element of which comprises platinum.

7. A thermocouple, one member of which comprises an iron-base nickel-cobalt alloy, and a second member of which comprises one of the following metals; molybdenum, tungsten and platinum.

8. A thermocouple, one member of which consists of an iron-base alloy comprising a combined nickel and cobalt content of between 40% and 55% with the cobalt at least 6.75%, and the second element of which comprises one of the following metals: molybdenum, tungsten and platinum.

RURIC C. MASON.